G. H. BUZZELL.
HOSE-PIPE COUPLING.

No. 177,686.  Patented May 23, 1876.

Witnesses:
H. E. Metcalf
James M. Palmer

Inventor:
George H. Buzzell,
Per C. C. Shaw,
Atty.

UNITED STATES PATENT OFFICE.

GEORGE H. BUZZELL, OF BOSTON, MASSACHUSETTS.

IMPROVEMENT IN HOSE-PIPE COUPLINGS.

Specification forming part of Letters Patent No. 177,686, dated May 23, 1876; application filed April 20, 1876.

*To all whom it may concern:*

Be it known that I, GEORGE H. BUZZELL, of Boston, in the county of Suffolk, State of Massachusetts, have invented a certain new and useful Improvement in Hose-Pipe Couplings, of which the following is a description sufficiently full, clear, and exact to enable any person skilled in the art or science to which my invention appertains to make and use the same, reference being had to the accompanying drawing, forming a part of this specification, in which—

Figure 1:
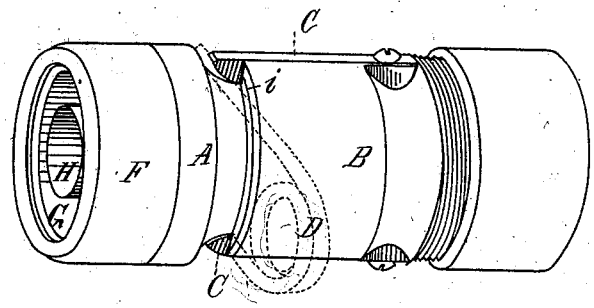
Figure 2:
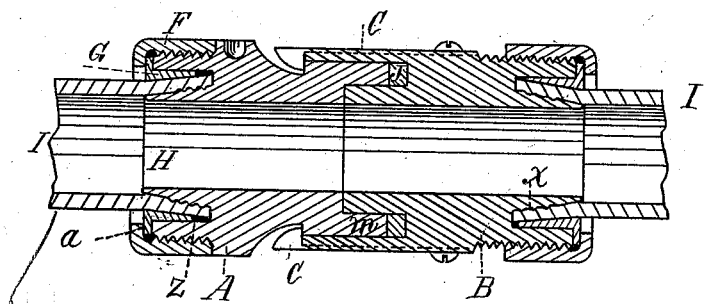

Figure 1 is an isometrical perspective view, and Fig. 2 a vertical longitudinal section.

Like letters of reference indicate corresponding parts in the different figures of the drawing.

My invention relates, principally, to that class of hose-pipe couplings which are designed for use with hose-pipe composed wholly or in part of rubber; and consists in a novel construction and arrangement of the parts, as hereinafter more fully set forth and claimed, by which a more effective device of this character is produced than is now in ordinary use.

The nature and operation of my invention will be readily understood by all conversant with such matters from the following description.

In the drawing, A B represent the body of the coupling, which is composed of two detachable sections or parts, formed as best seen in Fig. 2. The section B is provided with an annular groove or socket, J, cut in the face of ts inner end, into which a corresponding flange, *m*, on the part A projects when the two sections are joined or in position. The outer end of the section A is exteriorly threaded to receive the thimble F, and in its face there is an annular groove or channel, *z*, which onverges or is narrowest at the bottom, forming the conical nipple H. A metallic ring, G, the form of a hollow conical frustum, with an outwardly-projecting flange, *a*, around its base, is fitted to work loosely in the groove *z*, there being sufficient space between the inner side of the ring and the outer side of the nipple H to admit the end of the hose-pipe I. The thimble F is provided with a hole through its top, corresponding with the size of the pipe I, and the two sections of the coupling are united by means of the spring-hooks C engaging with the shoulder *i*.

The construction of the outer end of the part B corresponds with that of the part A.

In the use of my improved coupling the end of the hose is passed through the hole in the top of the thimble F. The ring G is then slipped over the hose and along the same into the thimble, the flange on the ring being arranged adjoining the inner side of the head or top of the thimble. The end of the hose is then pushed on over the nipple H, and the thimble F screwed onto the section A, forcing the ring G into the groove *z*, and securely wedging or confining the hose in the coupling, the corresponding section of hose being secured in the section B in the same manner.

To increase the friction between the nipple and hose the outer side of the former, near its base, is corrugated, as shown at *x*.

Having thus explained my improvement, what I claim is—

The improved hose-pipe coupling described, consisting of the part A, provided with the flange *m*, shoulder *i*, thimble F, ring G, groove *z*, and nipple H, and the part B, provided with the socket J, spring-hook C, thimble F, ring G, groove *z*, and nipple H, all constructed and arranged to operate in combination with the pipe I, substantially as set forth and specified.

GEORGE H. BUZZELL.

Witnesses:
C. A. SHAW,
H. E. METCALF.